(12) United States Patent
Marvi et al.

(10) Patent No.: US 11,504,854 B2
(45) Date of Patent: Nov. 22, 2022

(54) SYSTEMS AND METHODS FOR ROBOTIC SENSING, REPAIR AND INSPECTION

(71) Applicants: Hamidreza Marvi, Tempe, AZ (US); Ehsan Dehghan-Niri, Las Cruces, NM (US); Mahdi Ilami, Tempe, AZ (US)

(72) Inventors: Hamidreza Marvi, Tempe, AZ (US); Ehsan Dehghan-Niri, Las Cruces, NM (US); Mahdi Ilami, Tempe, AZ (US)

(73) Assignees: Arizona Board of Regents on Behalf of Arizona State University, Tempe, AZ (US); Arrowead Center, Las Cruces, NM (US)

( * ) Notice: Subject to any disclaimer, the term of this patent is extended or adjusted under 35 U.S.C. 154(b) by 146 days.

(21) Appl. No.: 16/844,519

(22) Filed: Apr. 9, 2020

(65) Prior Publication Data
US 2020/0324415 A1    Oct. 15, 2020

Related U.S. Application Data

(60) Provisional application No. 62/831,268, filed on Apr. 9, 2019.

(51) Int. Cl.
*B25J 9/16* (2006.01)

(52) U.S. Cl.
CPC ........... *B25J 9/1694* (2013.01); *B25J 9/1664* (2013.01)

(58) Field of Classification Search
CPC ........ B25J 9/1694; B25J 9/1664; B25J 9/065; B25J 15/0009; B25J 15/0038; B25J 15/0213; B25J 19/026; B25J 15/0033; B25J 15/0206; B25J 13/087; G01N 2291/0234; G01N 2291/0258; G01N 2291/0427; G01N 2291/2634; G01N 29/069; G01N 29/225; G01N 29/228; G01N 29/2412; G01N 29/24; G01N 2015/142; G01N 2021/1708; G01N 29/04; G01N 29/041; G01N 29/046; G01N 29/06; G01N 29/0663; G01N 29/11; G01N 29/2437; G01N 29/2462; G01N 29/34; G01N 29/343; G01N 29/348; G01N 29/36; G01N 29/44; G01N 29/4445; G01N 29/4454; G01N 21/9505; G01N 2203/006;
(Continued)

(56) References Cited

U.S. PATENT DOCUMENTS 9,193,402 B2 * 11/2015 Chin ...................... B25J 5/00
9,879,981 B1    1/2018 Dehghan Niri et al.
(Continued)

FOREIGN PATENT DOCUMENTS

WO    2020191399 A1    9/2020
WO    2021041471 A1    3/2021

OTHER PUBLICATIONS

Salamone, "A multi-helical ultrasonic imaging approach for the structural health monitoring of cylindrical structures", Jan. 2015, Structural Health Monitoring vol. 14, pp. 73-85 (Year: 2015).*
(Continued)

*Primary Examiner* — Abby Y Lin
*Assistant Examiner* — Esvinder Singh
(74) *Attorney, Agent, or Firm* — Polsinelli PC (57) ABSTRACT

Various embodiments of a bio-inspired robot operable for detecting crack and corrosion defects in tubular structures are disclosed herein.

20 Claims, 9 Drawing Sheets
(9 of 9 Drawing Sheet(s) Filed in Color)

(58) Field of Classification Search
CPC .......... G01N 2203/0062; B62D 57/024; B06B
1/0215; B06B 1/0246; B06B 1/0261;
B06B 1/04; B06B 2201/54; B06B
2201/55; B06B 2201/40; G01H 1/04;
G01H 9/008; G01H 11/08; G05B
2219/37044; G05B 2219/37032
See application file for complete search history.

(56) References Cited

U.S. PATENT DOCUMENTS

| | | | |
|---|---|---|---|
| 2016/0025684 A1* | 1/2016 | Deneuville | G01N 29/2456 73/622 |
| 2017/0168024 A1 | 6/2017 | Dehghan Niri et al. | |
| 2017/0176397 A1* | 6/2017 | Oono | G01N 29/2487 |
| 2017/0191966 A1 | 7/2017 | Dehghan Niri et al. | |
| 2017/0199160 A1 | 7/2017 | Dehghan Niri et al. | |
| 2017/0370857 A1 | 12/2017 | Dehghan Niri et al. | |
| 2018/0038779 A1 | 2/2018 | Dehghan Niri et al. | |
| 2019/0054637 A1* | 2/2019 | Asada | B25J 9/065 |
| 2019/0077472 A1* | 3/2019 | Harris | G01N 29/225 |
| 2020/0108501 A1* | 4/2020 | Hong | G01N 29/4445 |
| 2020/0262261 A1* | 8/2020 | Loosararian | G01N 29/46 |
| 2020/0286657 A1 | 9/2020 | Marvi et al. | |
| 2021/0071801 A1* | 3/2021 | Lisnyak | G01N 27/83 |
| 2021/0310991 A1* | 10/2021 | Kassis | G01N 29/043 |

OTHER PUBLICATIONS

U.S. Appl. No. 17/105,011, filed Nov. 25, 2020, Marvi et al.
U.S. Appl. No. 17/201,616, filed Mar. 15, 2021, Marvi et al.
Hirao, et al., EMATs for Science and Industry: Noncontacting Ultrasonic Measurements, KluwerAcademic Publishers, 2003.
Shull, Nondestructive evaluation: theory, techniques, and applications. New York: Marcel Dekker, 2002.
Speight, Coal-Fired Power Generation Handbook, Wiley, 2013.
Zhang, Ultra-Supercritical Coal Power Plants, First, Woodhead Publishing, 2013.
Alleyne, et al., The reflection of guided waves from circumferential notches in pipes. J Appl Mech 1998; 65: 635-641.
Autumn, et al., Adhesive force of a single gecko foot-hair, Nature. 405 (2000) 681-685.
Autumn, et al., Evidence for van der waals adhesion in gecko setae, in: Proc. Natl. Acad. Sci., 2002: pp. 12252-12256.
Badodkar, et al., EMAT integrated with vertical climbing robot for boiler tube inspection, Proceedings of the National Seminar & Exhibition on Non-Destructive Evaluation (NDE 2009), Chennai. 2009.
Bagheri, et al., Animal and robotic locomotion on wet granular media, in: Conf. Biomim. Biohybrid Syst., Springer, 2017: pp. 13-24.
Bagheri, et al., Reference-free damage detection by means of wavelet transform and empirical mode decomposition applied to Lamb waves. J Intel Mat Syst Str 2013; 24: 194-208.
Belanger, et al., Feasibility of low frequency straight-ray guided wave tomography. NDT&E Int 2009; 42: 113-119.
Belanger, et al., Guided wave diffraction tomography within the born approximation., IEEE Trans. Ultrason. Ferroelectr. Freq. Control. 57 (2010) 1405-18. doi:10.1109/TUFFC.2010.1559.
Bhushan, Biomimetics: lessons from nature-an overview, 2009.
Buhl, et al., Humidity influence on the adhesion of biomimetic fibrillar surfaces, Int. J. Mater. Res. 100 (2009) 1119-1126.
Caprari, et al., Highly compact robots for inspection of power plants, Journal of Field Robotics 29.1 (2012): 47-68.
Carandente, et al., The influence of sharp edges in corrosion profiles on the reflection of guided waves. NDT&E Int 2012; 52: 57-68.
Cawley, et al., Corrosion monitoring strategies—choice between area and point measurements. J Nondestruct Eval 2013; 32: 156-163.
Curet, et al., Mechanical properties of a bio-inspired robotic knifefish with an undulatory propulsor, Bioinspir. Biomim. 6 (2011) 26004.

Cutkosky, et al., Design and fabrication of multi-material structures for bioinspired robots, Philos. Trans. R. Soc. London A Math. Phys. Eng. Sci. 367 (2009) 1799-1813.
Dehghan Niri, et al., A Probabilistic Framework for Acoustic Emission (AE) Source Localization in Plate-Like Structures, Smart Mater. Struct. (2012).
Dehghan Niri, et al., Adaptive multisensor data fusion for acoustic emission source localization in noisy environment, Struct. Heal. Monit. 2012; 12:59-77 (2013). doi:10.1177/1475921712462937.
Dehghan Niri, et al., Nonlinear Kalman Filtering for acoustic emission source localization in anisotropic panels., Ultrasonics. 54 (2013) 486-501. doi:10.1016/j.ultras.2013.07.016.
Dehghan-Niri, et al., A multi-helical ultrasonic imaging approach for the structural health monitoring of cylindrical structures, Struct. Heal. Monit. (2014). doi:10.1177/1475921714548937.
Dehghan-Niri, et al., Phase-space topography characterization of nonlinear ultrasound waveforms, Ultrasonics. 84 (2018). doi:10.1016/j.ultras.2017.12.007.
Dehghan-Niri, Quantitative corrosion imaging of pipelines using multi helical guided ultrasonic waves, Struct. Monit. Maint. 3 (2016). doi:10.12989/smm.2016.3.3.215.
Del Campo, et al., Contact shape controls adhesion of bioinspired fibrillar surfaces, Langmuir. 23 (2007) 10235-10243.
Ditri, Utilization of guided elastic waves for the characterization of circumferential cracks in hollow cylinders. J Acoust Soc Am 1994; 96: 3769-3775.
Fan, et al., A comparison between ultrasonic array beamforming and super resolution imaging algorithms for non-destructive evaluation., Ultrasonics. 54 (2014) 1842-1850.
Farhidzadeh, et al., Post-earthquake evaluation of pipelines rehabilitated with cured in place lining technology using acoustic emission, Constr. Build. Mater. 54 (2014). doi:10.1016/j.conbuildmat.2013.12.048.
Fessler, Pipeline corrosion. Report, US Department of Transportation Pipeline and Hazardous Materials Safety Administration, Baker, Evanston, IL, Nov. 2008.
Fischer, et al., Foldable magnetic wheeled climbing robot for the inspection of gas turbines and similar environments with very narrow access holes, Industrial Robot: An International Journal 37.3 (2010): 244-249.
Gao, et al., Boiler maintenance robot with multi-operational schema, 2008 IEEE International Conference on Mechatronics and Automation. IEEE, 2008.
Gao, et al., Multifunctional robot to maintain boiler water-cooling tubes, Robotica 27.6 (2009): 941-948.
Glasheen, et al., Size-dependence of water-running ability in basilisk lizards (*Basiliscus basiliscus*), Exp. Biol. 199 (1996) 2611-2618.
Gorb, Biological attachment devices: exploring nature's diversity for biomimetics, Philos. Trans. R. Soc. London A Math. Phys. Eng. Sci. 366 (2008) 1557-1574.
Guo, et al., A new transducer holder mechanism for pipe inspection. J Acoust Soc Am 2001; 110: 303-309.
Hall, et al., Minimum variance ultrasonic imaging applied to an in situ sparse guided wave array. IEEE T Ultrason Ferr 2010; 57: 2311-2323.
Han, et al.,m Fiberbot: A miniature crawling robot using a directional fibrillar pad, in: Robot. Autom. (ICRA), 2015 IEEE Int. Conf., 2015: pp. 3122-3127.
Hay, et al., A comparison of embedded sensor Lamb wave ultrasonic tomography approaches for material loss detection, Smart Mater. Struct. 15 (2006) 946-951. doi:10.1088/0964-1726/15/4/007.
Heepe, et al., Biologically inspired mushroom-shaped adhesive microstructures, Annu. Rev. Mater. Res. 44 (2014) 173-203.
Hinders, et al., Contact scanning Lamb wave tomography. J Acoust Soc Am 1998; 104: 1790-1791.
Holmes, et al., The dynamics of legged locomotion: Models, analyses, and challenges, Siam Rev. 48 (2006) 207-304.
Huber, et al., Influence of surface roughness on gecko adhesion, Acta Biomater. 3 (2007) 607-610.
Huerzeler, et al., Applying aerial robotics for inspections of power and petrochemical facilities, 2012 2nd International Conference on Applied Robotics for the Power Industry (CARPI). IEEE, 2012.

(56) References Cited

OTHER PUBLICATIONS

Huthwaite, et al., High-resolution guided wave tomography. Wave Motion 2013; 50: 979-993.

Irschick, et al., Comparative three-dimensional kinematics of the hindlimb for high-speed bipedal and quadrupedal locomotion of lizards, J. Exp. Biol. 202 (1999) 1047-1065.

Jagota, et al., Mechanics of adhesion through a fibrillar microstructure, Integr. Comp. Biol. 42 (2002) 1140-1145.

Jansen, et al., Immersion tomography using Rayleigh and Lamb waves. Ultrasonics 1992; 30: 245-254.

Xueqin, et al., The design of an inspection robot for boiler tubes inspection, 2009 International Conference on Artificial Intelligence and Computational Intelligence. vol. 2. IEEE, 2009.

Yoon, et al., New algorithm for acoustic emission source location in cylindrical structures. J Acoust Emiss 1992; 9: 237-242.

Zhao, et al., Active health monitoring of an aircraft wing with embedded piezoelectric sensor/actuator network: I. Defect detection, localization and growth monitoring, Smart Mater. Struct. 16 (2007) 1208-1217. doi:10.1088/0964-1726/16/4/032.

Zhou, et al., Recent advances in gecko adhesion and friction mechanisms and development of gecko-inspired dry adhesive surfaces, Friction. 1 (2013) 114-129.

Ghyabi, et al., Total Focusing Method Development for Lamb Wave Based Structural Health Monitoring, ASNT 26th Annual Research Symposium, Mar. 26-29, 2018, Orlando, FL, 15 pages.

Jayne, et al., Effects of incline on speed, acceleration, body posture and hindlimb kinematics in two species of lizard *Callisaurus draconoides* and *Uma scoparia*, J. Exp. Biol. 201 (1998) 273-287.

Kamperman, et al., Functional adhesive surfaces with gecko effect: The concept of contact splitting, Adv. Eng. Mater. 12 (2010) 335-348.

Lee H, Yang J and Sohn H. Baseline-free pipeline monitoring using optical fiber-guided laser ultrasonics. Struct Health Monit 2012; 11: 684 695.

Leonard, et al., Guided wave helical ultrasonic tomography of pipes. J Acoust Soc Am 2003; 114: 767-774.

Leonard, et al., Lamb wave tomography of pipe-like structures. Ultrasonics 2005; 43: 574-583.

Leonard, et al., Multi-mode Lamb wave tomography with arrival time sorting. J Acoust Soc Am 2005; 117: 2028-2038.

Leonard, et al., Ultrasonic Lamb wave tomography, Inverse Probl. 18 (2002) 1795-1808. doi:10.1088/0266-5611/18/6/322.

Li, et al., A novel mobile robot for finned tubes inspection, Robotica 21.6 (2003): 691-695.

Li, et al., Excitation and propagation of non-axisymmetric guided waves in a hollow cylinder. J Acoust Soc Am 2001; 109: 457-464.

Li, et al., Multi-functional foot use during running in the zebra-tailed lizard (*Callisaurus draconoides*), J. Exp. Biol. 215 (2012) 3293-3308.

Li, et al., Natural beam focusing of non-axisymmetric guided waves in large-diameter pipes., Ultrasonics. 44 (2006) 35-45. doi:10.1016/j.ultras.2005.07.002.

Lum, et al., Shape-programmable magnetic soft matter, in: Proc. Natl. Acad. Sci., 2016: p. 201608193.

Ma, et al., Controlled flight of a biologically inspired, insect-scale robot, Science (80-.). 340 (2013) 603-607.

Malyarenko, et al., Fan beam and double crosshole Lamb wave tomography for mapping flaws in aging aircraft structures. J Acoust Soc Am 2000; 108: 1631-1639.

Malyarenko, et al., Ultrasonic Lamb wave diffraction tomography. Ultrasonics 2001; 39: 269-281.

Marketsandmarkets.com, Global Non-Destructive Testing Market—By Type (Equipment, Service), Technique (Volumetric Examination, Surface Examination, Condition Monitoring, Integrity Examination), Technology, Industry, Geography, Trends, Forecast—(2017-2022), 2017.

Marvi, et al., Actively controlled fibrillar friction surfaces, Appl. Phys. Lett. 106 (2015) 51602.

Marvi, et al., Experimental investigation of optimal adhesion of mushroomlike elastomer microfibrillar adhesives, Langmuir. 31 (2015) 10119-10124.

Marvi, et al., Friction enhancement in concertina locomotion of snakes, J. R. Soc. Interface. 9 (2012) 3067-3080.

Marvi, et al., Scalybot: a snake-inspired robot with active control of friction, in: ASME 2011 Dyn. Syst. Control Conf. Bath/ASME Symp. Fluid Power Motion Control, merican Society of Mechanical Engineers, 2011: pp. 443-450.

Marvi, et al., Sidewinding with minimal slip: Snake and robot ascent of sandy slopes, Science (80-.). 346 (2014) 224-229.

Marvi, et al., Snakes mimic earthworms: propulsion using rectilinear travelling waves, J. R. Soc. Interface. 10 (2013) 20130188.

Marvi, et al., Snakes move their scales to increase friction, Biotribology. (2015).

Mckeon, et al., Parallel projection and crosshole Lamb wave contact scanning tomography. J Acoust Soc Am 1999; 106: 2568-2577.

Menon, et al., Gecko inspired surface climbing robots, 2004 IEEE International Conference on Robotics and Biomimetics. IEEE, 2004.

Moustafa, et al., Corrosion monitoring of post-tensioned concrete structures using fractal analysis of guided ultrasonic waves, Struct. Control Heal. Monit. 21 (2014). doi:10.1002/stc.1586.

Moustafa, et al., Fractal dimension-based Lamb wave tomography algorithm for damage detection in plate-like structures. J Intel Mat Syst Str 2012; 23: 1269-1276.

Murphy, et al., Disaster robotics, in Springer Handb. Robot., Springer, 2016: pp. 1577-1604.

Nagy, et al., Corrosion and erosion monitoring in plates and pipes using constant group velocity Lamb wave inspection. Ultrasonics 2014; 54: 1832-1841.

Park, et al., Development of mobile robot systems for automatic diagnosis of boiler tubes in fossil power plants and large size pipelines. IEEE/RSJ International Conference on Intelligent Robots and Systems. vol. 2. IEEE, 2002.

Pattantyus-Abraham, et al., Recent advances in nanostructured biomimetic dry adhesives, Front. Bioeng. Biotechnol. 1 (2013).

Pei, et al., Lamb wave tomography and its application in pipe erosion/corrosion monitoring. In: Proceedings of the IEEE ultrasonics symposium 1995, Seattle, WA, Nov. 7-10, 1995, vol. 1, pp. 795-798. New York: IEEE.

Pierce, et al., Elastic wave propagation from point excitations on thin-walled cylindrical shells. J Vib Acoust 1990; 112: 399-406.

Qing, et al., Development of a real-time active pipeline integrity detection system. Smart Mater Struct 2009; 18: 115010.

Raibert, et al., The rough-terrain quadruped robot, in: 17th World Congr., 2008: pp. 10822-10825.

Roman, Robotic applications in PSE&G's nuclear and fossil power plants, IEEE transactions on energy conversion 8.3 (1993): 584-592.

Rose, A baseline and vision of ultrasonic guided wave inspection potential. J Press Vess: T ASME 2002; 124: 273-282.

Rose, et al., Ultrasonic guided wave NDE for piping. Mater Eval 1996; 54: 1310-1313.

Sadek, NDE technologies for the examination of heat exchangers and boiler tubes—Principles, advantages and limitations, Insight Non-Destructive Test. Cond. Monit. 48 (2006) 181-183. doi:10.1784/insi.2006.48.3.181.

Sameoto, et al., Recent advances in the fabrication and adhesion testing of biomimetic dry adhesives, Smart Mater. Struct. 19 (2010) 103001.

Schmitz, et al., Experiences with synthetic aperture focusing technique in the field, Ultrasonics. 38 (2000) 731-738.

Seher, et al., Model-Based Design of Low Frequency Lamb Wave EMATs for Mode Selectivity, J. Nondestruct. Eval. 34 (2015). doi:10.1007/s10921-015-0296-6.

Spies, et al., Aperture focusing for defect reconstruction in anisotropic media, Ultrasonics. 41 (2003) 125-131.

Stefanini, et al., A novel autonomous, bioinspired swimming robot developed by neuroscientists and bioengineers, Bioinspir. Biomim. 7 (2012) 25001.

(56) References Cited

OTHER PUBLICATIONS

Stepinski, et al., Beamforming of Lamb waves using 2D arrays: A comparative study, in: Fu-Kuo Chang (Ed.), 9th Int. Work. SHM, 2013: pp. 2210-2217.
Tesch, et al., Parameterized and scripted gaits for modular snake robots, Adv. Robot. 23 (2009) 1131-1158.
Thoesen, et al., Screw-powered propulsion in granular media: An experimental and computational study, in: IEEE Int. Conf. Robot. Autom., 2018.
Wilcox, et al., The excitation anddetection of Lambwaveswith planar coil electromagnetic acoustic transducers, IEEETrans. Ultrason. Ferroelectr. Freq.Control. 52 (2005) 2370-2383.
Willey, et al., Guided wave tomography of pipes with high-order helical modes. NDT&E Int 2014; 65: 8-21.
Wright, et al., Air-coupled Lamb wave tomography. IEEE T Ultrason Ferr 1997; 44: 53-59.

\* cited by examiner

SYSTEMS AND METHODS FOR ROBOTIC SENSING, REPAIR AND INSPECTION

GOVERNMENT SUPPORT

The invention was made with government support under DE-FE0031649 awarded by the US Department of Energy. The government has certain rights in the invention.

FIELD

The present disclosure generally relates to non-destructive testing (NDT); and in particular, to a bio-inspired robot for non-destructive testing and inspection of tubular structures using multi-transducer imaging.

BACKGROUND

Tubular structures are commonly used in boilers and heat exchangers. Working under extreme conditions such as high temperatures, large stress loads, hot and high-velocity steam and pressure leads to corrosion, cracks, and stress-corrosion cracks in either the body or welded connections of these components. Regular inspection of these components is vital to avoid tube leakages. This task can be challenging, time-consuming and in many cases, impossible. Using robots for inspection is a promising solution to these challenges. Typical robotic systems show limitation in interacting with complex environments, however, bio-inspired robotics systems have proven helpful in overcoming these limitations. Tokay geckos, for instance, have one of the most effective and versatile attachment systems which enable them to attach quickly and reversibly to surfaces of varying chemistry and topography.

Detecting and characterizing corrosion and crack type defects on tubular structures is one of the major problems faced by the power generation industry. One approach for the measurement of remaining wall thickness and crack detection is to use ultrasound. Contact ultrasound testing (UT) based on bulk waves is time-consuming and requires prepared surfaces of adequate couplant for point-by-point scanning. Recent developments in couplant-free UT may remove a need for couplant in ultrasound technologies, and the development of advanced Lamb wave-based imaging may eliminate the need for point-by-point inspection of the cross-section of a tubular structure.

It is with these observations in mind, among others, that various aspects of the present disclosure were conceived and developed.

BRIEF DESCRIPTION OF THE DRAWINGS

The present patent or application file contains at least one drawing executed in color. Copies of this patent or patent application publication with color drawing(s) will be provided by the Office upon request and payment of the necessary fee.

FIGS. 6A and 6B are graphical representations of multi helical ultrasound imaging (MHUI) for corrosion detection and evaluation on a tubular surface using six omnidirectional Lamb wave transducers/sensors

FIGS. 7A and 7B are illustrative of Lamb wave-based total focusing method (TFM) for crack detection and evaluation.

Corresponding reference characters indicate corresponding elements among the view of the drawings. The headings used in the figures do not limit the scope of the claims.

DETAILED DESCRIPTION

A bio-inspired robotic device for detection and evaluation of crack and corrosion defects in tubes is disclosed herein. In one embodiment, the robotic device includes a pair of gripper blocks, each gripper block including a motor and a plurality of toes. Each of the plurality of toes includes a network of couplant-free ultrasound transducers for non-destructive testing of surfaces. In addition, each toe includes frictional pads that can be used for effective climbing of tubes or other surfaces. In some embodiments, the pair of gripper blocks are linked by a bendable "backbone" which is capable of elongation to allow the robot to maneuver along pipes and surfaces. In some embodiments, the robotic device further includes a tail equipped with various transducers for further examination of tube surfaces. Referring to the drawings, embodiments of the tube-inspector robotic device, herein referred to as "the robot", are illustrated and generally indicated as 100 in FIGS. 1-8.

Robot Structure: Bio-Inspired Design

Figure 1:
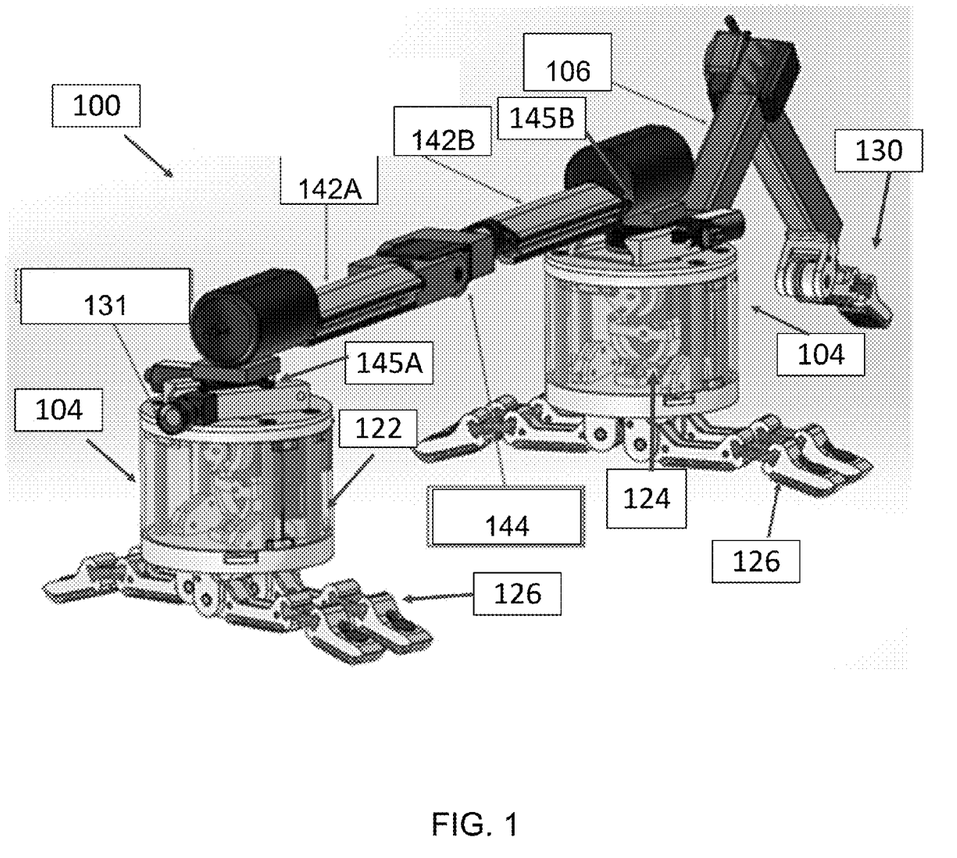
FIG. 1 is a perspective view of one embodiment of a bio-inspired robot (e.g. lizard-inspired tube inspector (LTI) robot).
Figure 2A:
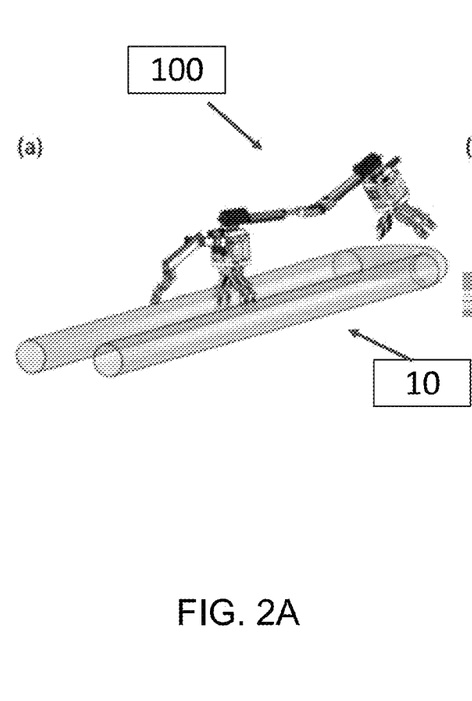
FIGS. 2A, 2B, and 2C are illustrations showing three different tube configuration scenarios that the lizard-inspired tube inspector (LTI) robot may be operable to handle: a 180 degree elbow, a 90 degree elbow, and a flange, respectively.
Figure 2B:
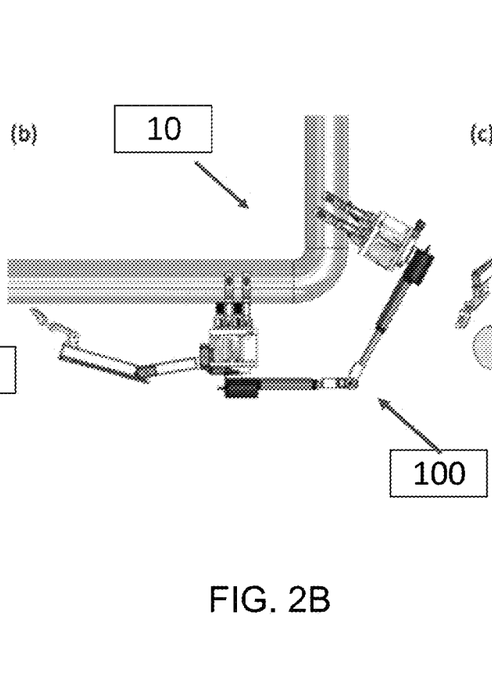
Figure 2C:
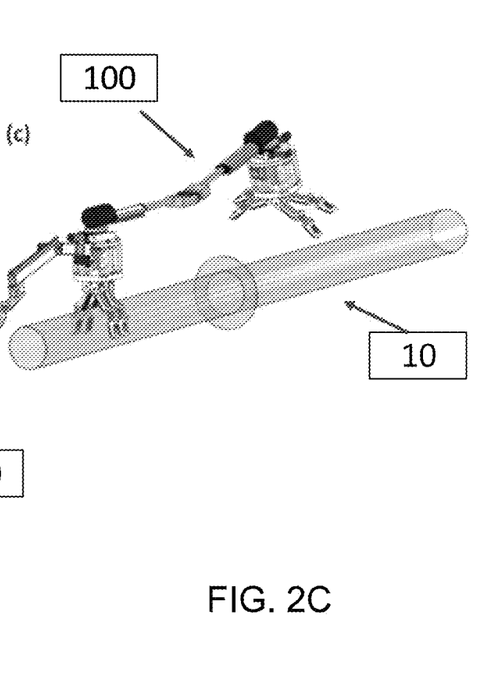

Referring to FIG. 1, a robot 100 for inspection and repair of tubes is shown including a pair of dexterous gripper blocks 104, each gripper block 104 having a plurality of toes 126. In some embodiments, each of the plurality of toes 126 is equipped with a friction pad 127 that can grip tubular surfaces 10 of different sizes having smooth or corroded surfaces. The gripper blocks 104 are connected by a backbone 108 that includes a first linear actuator 142A and a second linear actuator 142B linked by a rotational actuator 144. Referring to FIGS. 2A, 2B and 2C, the actuators 142 and 144 respectively enable forward/backward motion of the robot 100 and maneuvering on flanges, boiler walls, and elbows of 45, 90, and 180-degree angles. In some embodiments, the robot 100 includes a first and second motor 145A and 145B respectively engaging each gripper block 104 with the first and second linear actuators 142A and 142B. The first and second motor 145A and 145B serve to rotate each gripper block 104 relative to the backbone 108.

Figure 3A:
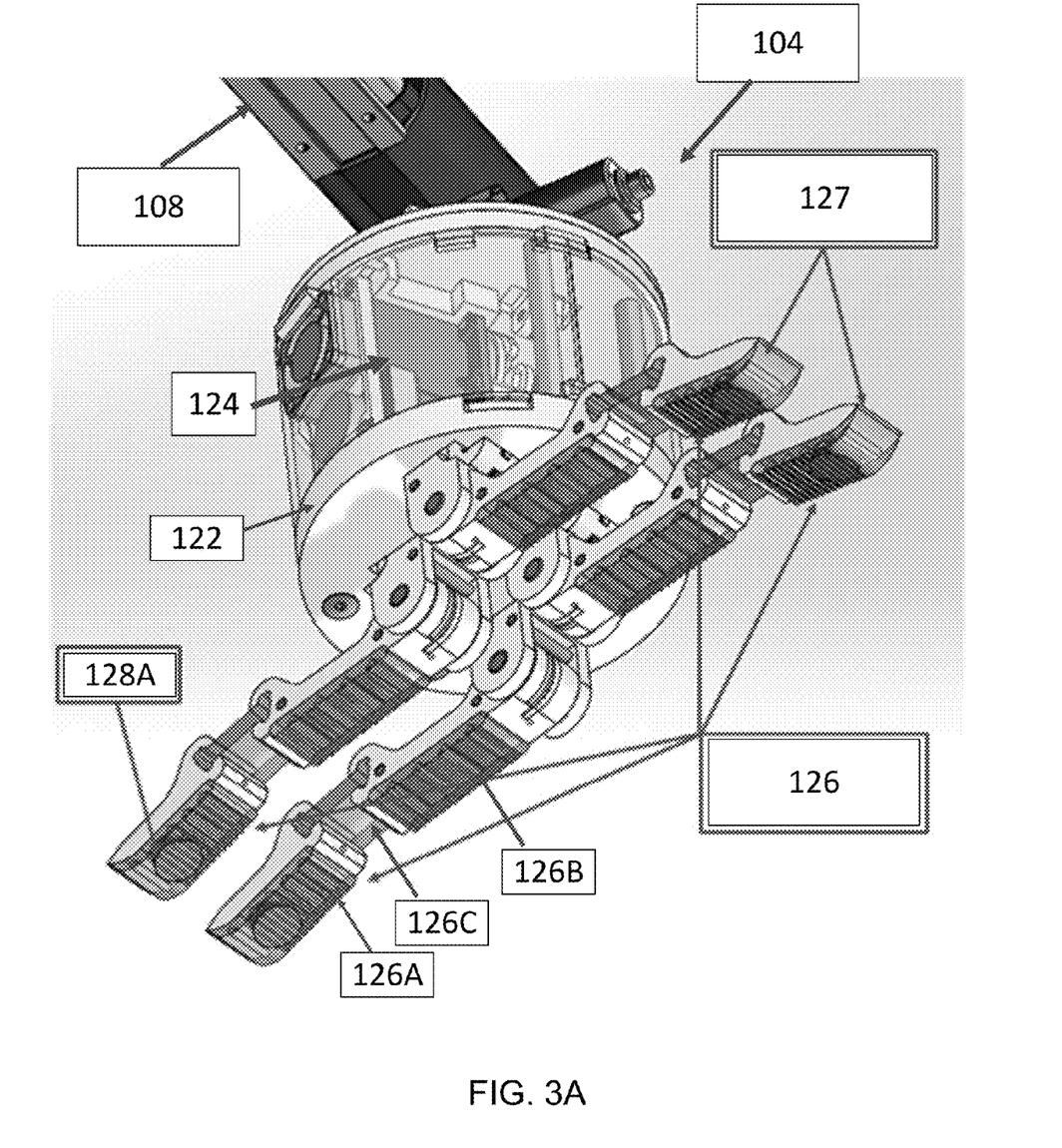
FIG. 3A is an illustration showing a first embodiment of the gripper assembly of the lizard-inspired tube inspector (LTI) robot of FIG. 1.
Figure 3B:
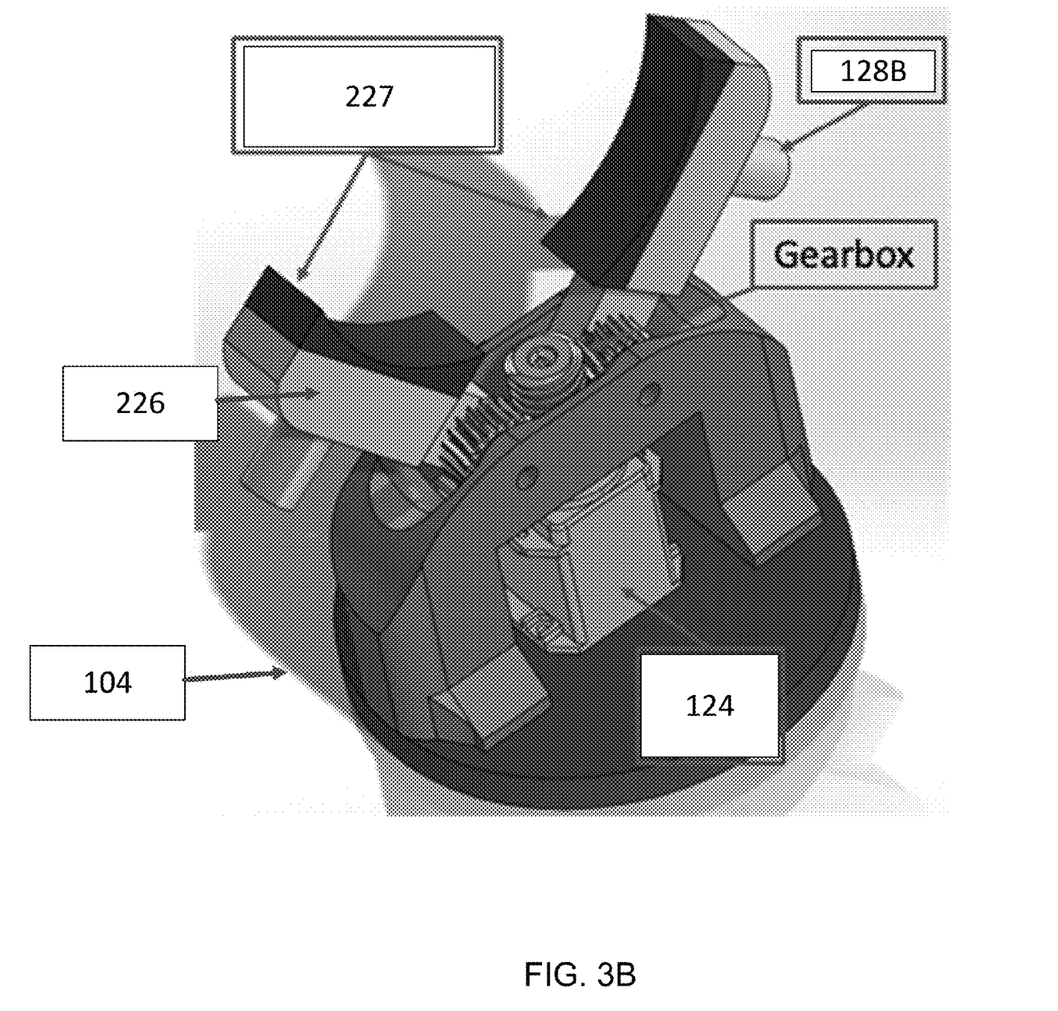
FIG. 3B is an illustration showing a second embodiment of the gripper assembly of the lizard-inspired tube inspector (LTI) robot of FIG. 1.
Figure 4:
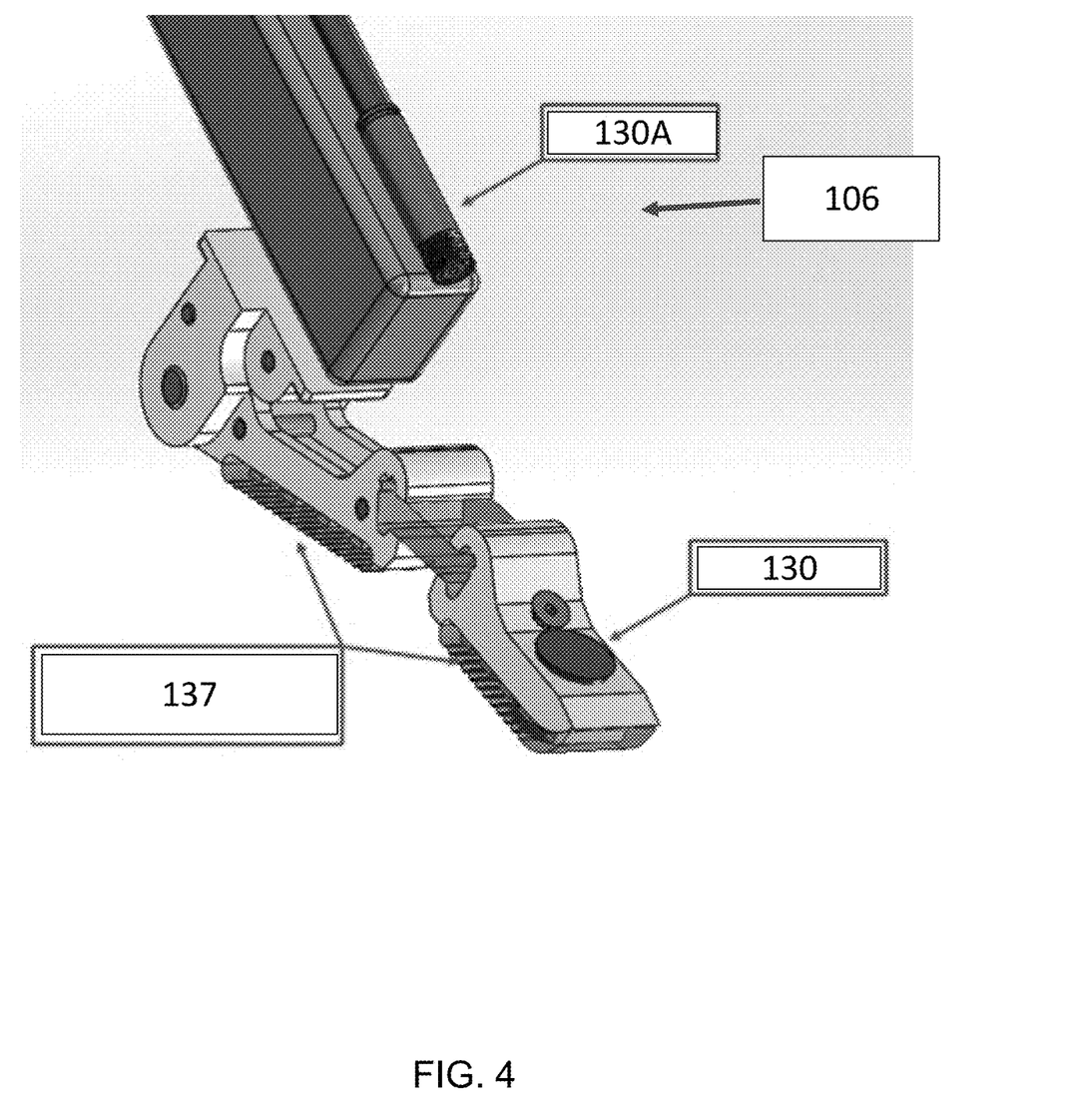
FIG. 4 is an illustration showing one embodiment of the tail assembly of the lizard-inspired tube inspector (LTI) robot of FIG. 1.

Embodiments of the gripper block 104 are shown in FIG. 3A-3B, featuring a motor 124 surrounded by a housing 122. Each of the plurality of toes 126 extend from an underside 129 of each gripper block 104. In some embodiments, each of the plurality of toes 126 includes the friction pad 127 and a transducer 128. FIG. 3A shows one embodiment having each of the toes 126 including a first and second segment 126A and 126B linked by a middle segment 126C. In an alternate embodiment shown in FIG. 3B, each of a plurality of toes 226 defines a curved profile. The curved profile includes a concave surface for engagement with a tubular structure 10. The concave surface further includes the friction pad 227 and the transducer 128. Referring to FIGS. 1 and 4, the robot 100 further includes a tail 106, shown in FIG. 4, for additional stability and inspection. The tail 106 carries one or more transducers 130 including a borescope 130A for tube inspection at desired locations that might be hard to access by the robot 100. In some embodiments, the tail 106 includes one or more tail friction pads 137 for additional support when climbing on tubular structures 10. The robot 100 includes one or more onboard controllers programmed in C. However, depending on the mission, data and power may be transmitted to/from the robot 100 wirelessly or through a tether. A combination of machining and rapid prototyping techniques (e.g. 3D printing, laser cutting, and hybrid deposition manufacturing) are used for fabrication of the robot 100. The gripper blocks 104 are fabricated using Hybrid Deposition Manufacturing (HDM) technique. The friction pads 127 are fabricated using soft lithography with micro-scale feature (e.g. fibers) out of Polydimethylsiloxane (PDMS) and Polyurethane. In some embodiments, shown in FIG. 1, a camera 131 is installed on at least one of the gripper blocks 104 for visual inspection.

Couplant-Free Ultrasound Generation

Couplant-free ultrasound transducers 128 are placed on the toes 126 of the gripper blocks 104. Recent developments in couplant-free ultrasound techniques in addition to development of advanced Lamb wave-based imaging remove the need for couplant and would also allow for inspection of a line between two transducers instead of point-by-point inspecting the cross section of a tube 10. To be able to use the toes 126 of the gripper blocks 104 as transducers, ultrasound waves need to transmit through the surfaces of the toes 126 with the friction pads 127.

Figure 5:
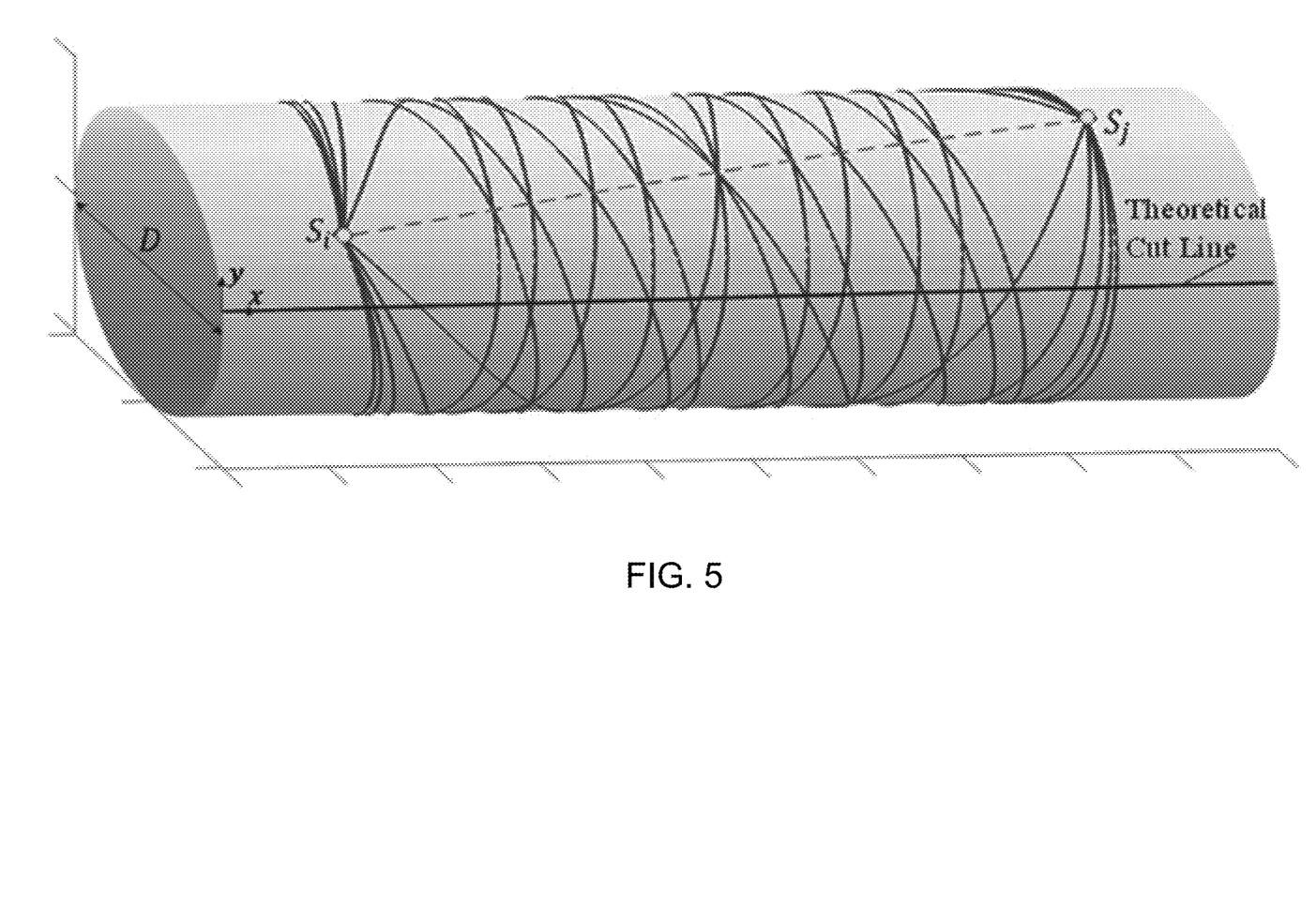
FIG. 5 illustrates helical paths between a pair of transducers/sensors on a tubular surface.
Figure 6A:
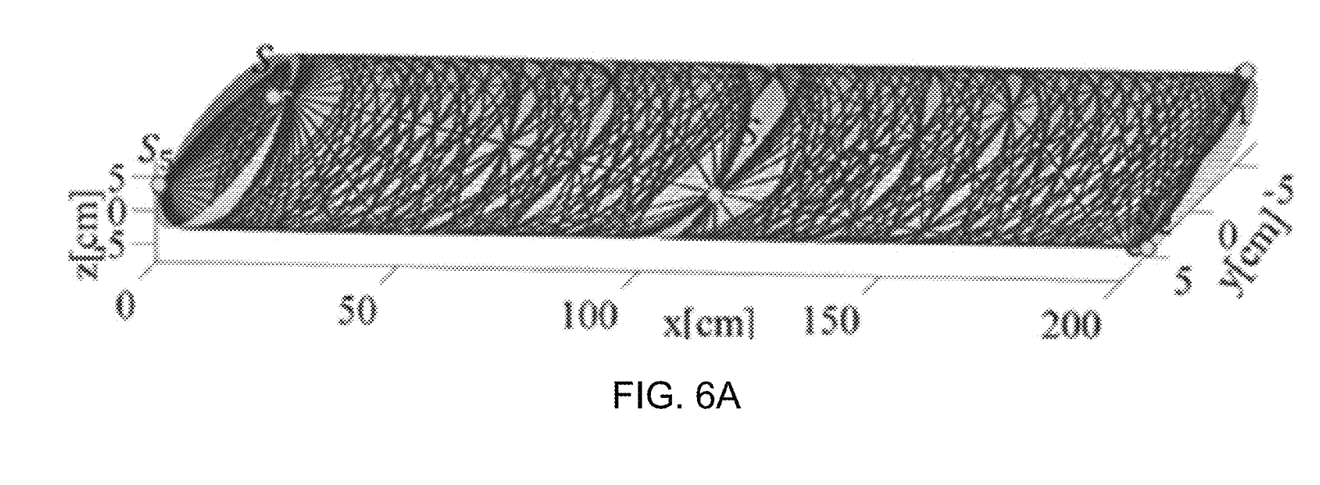
FIG. 6A depicts helical paths between the six transducers and FIG. 6B is the resulting MHUI image showing corrosion on the tubular surface.
Figure 6B:
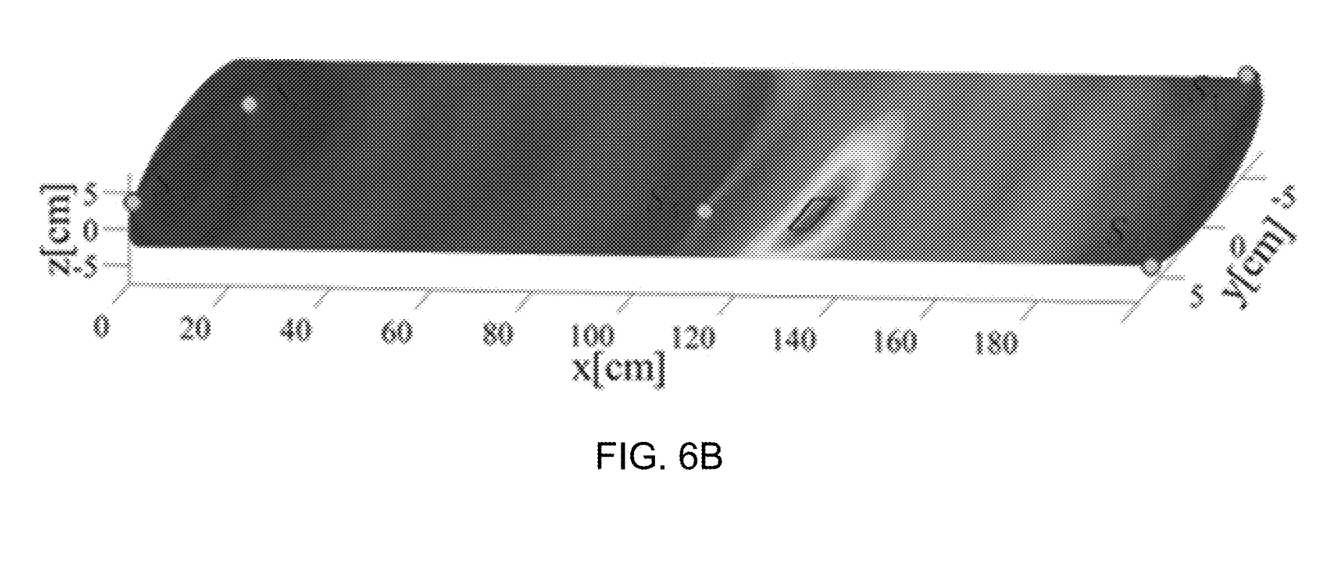

Two separate sensing methods may be utilized for generating and receiving Lamb waves: high-voltage ultrasound generation with pressurized contacted interfaces (achieved through the use of a piezoelectric transducer, which converts analog pressure into electrical signals), and an Electro Magnetic Acoustic Transducer (EMAT). A material and geometry of the friction pads 127 are optimized to maximize energy transmission. Ultrasound imaging based on guided ultrasound waves provides a unique solution to inspect a line between two transducers 128A and 128B (FIG. 3B) instead of point by point inspection of material. This capability can be exploited in the case of cylindrical structures (i.e. tubular structures 10) since theoretically there are infinite helical paths (lines to be inspected) between the two transducers 128, as illustrated in FIG. 5.

Imaging: Corrosion and Crack Detection and Evaluation

Figure 7A:
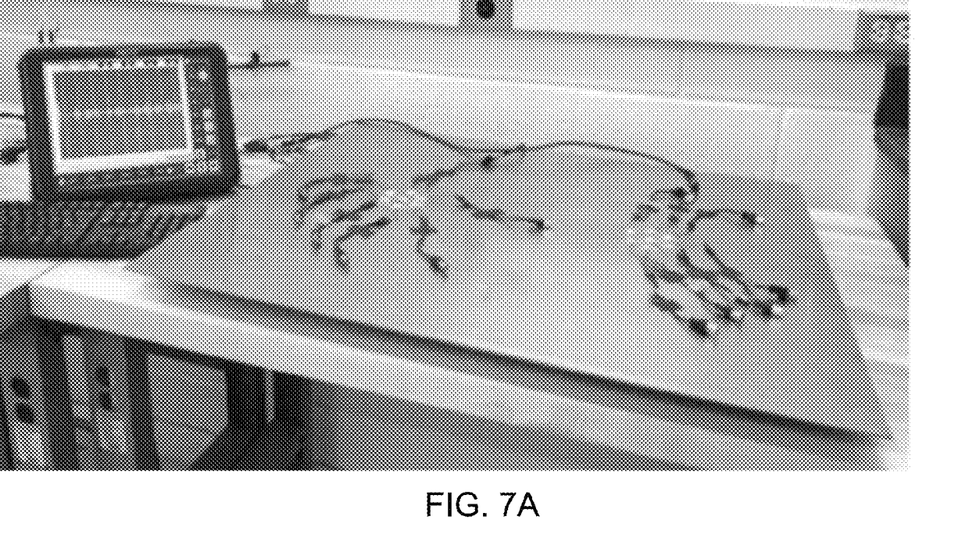
FIG. 7A is a photograph of two clusters of transducers on an aluminum plate during experimental testing and FIG. 7B is the resulting Lamb wave-based TFM image depicting a crack in the aluminum plate.
Figure 7B:
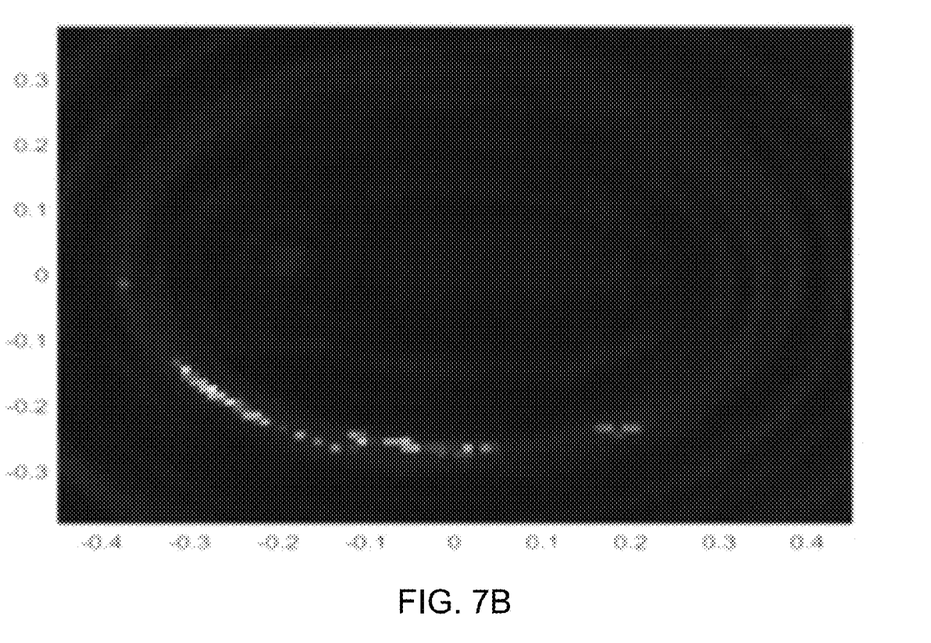
Figure 8:
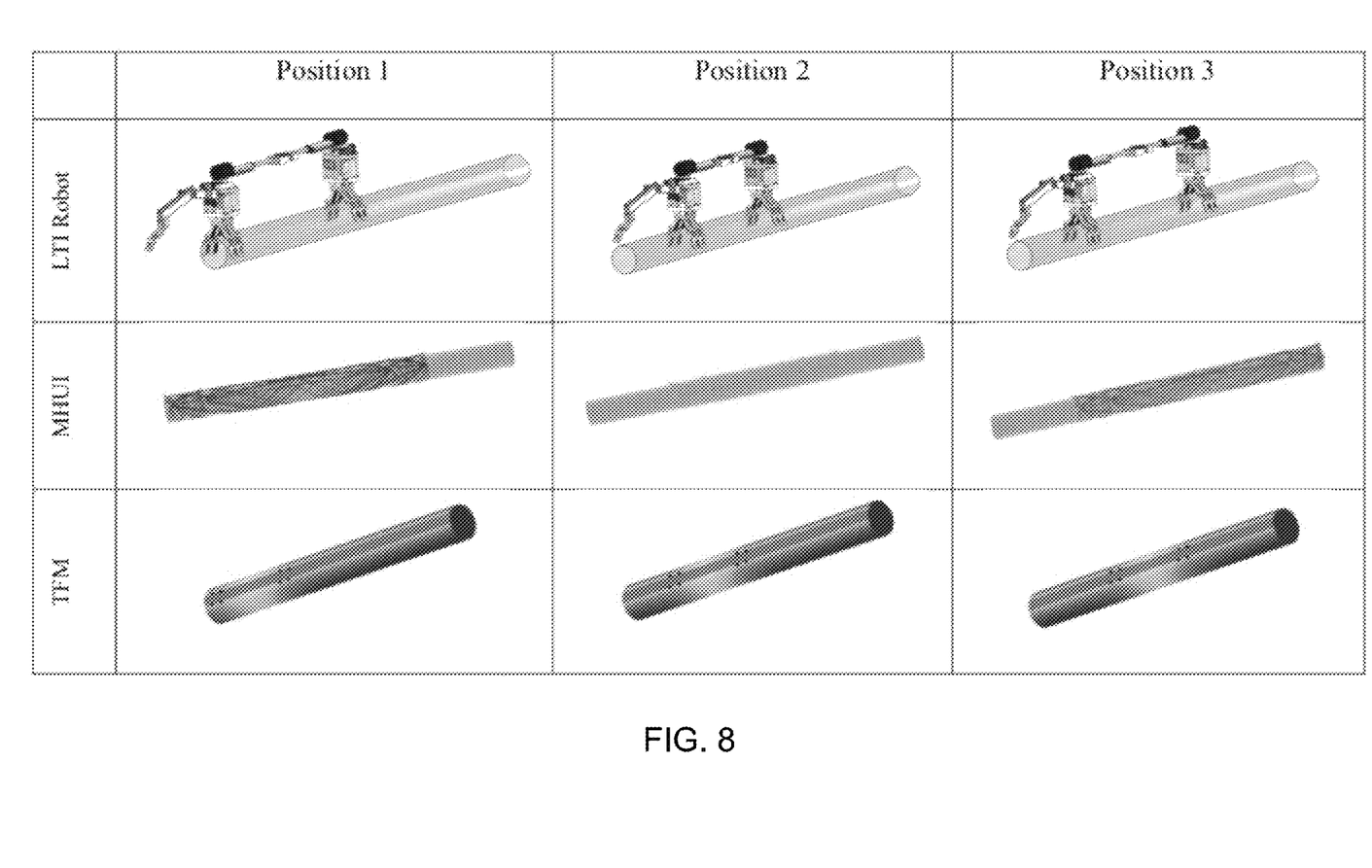
FIG. 8 is an illustration showing data collection for MHUI and Lamb-wave TFM data as well as coverage area through one cycle of movement of the lizard-inspired tube inspector robot of FIG. 1.

Multi-transducer imaging approaches based on through-transmission and pulse-echo technique are considered to develop an imaging method using the data captured by the robot 100 across multiple positions of the gripper blocks 104. For example, at one location the gripper blocks 104 may need to move and make different configurations. At each configuration, one transducer 128A of the gripper block 104 will excite guided ultrasound waves and another other transducer 128B will receive the ultrasonic waves (FIG. 3B). This is repeated between each transducer 128 in order to cover a large area of the tube 10. The robot 100 may change the gripper 104 configuration to capture new sets of data. An imaging method based on guided wave total focusing method (TFM) and Multi-Helical Ultrasound imaging (MHUI) are used to detect and evaluate crack and corrosion. The imaging methods are used as the robot 100 moves to construct images of the covered area. As shown in FIG. 8, as the robot 100 progresses along the area, based on the new sets of data at each new location, the images are updated. The transducers 128 do not need to contact every single inch of the surface and can instead take procedural ultrasound images which cover a wider range, thus making the inspection rapid and versatile. An illustration can be seen in FIGS. 6A and 6B where corrosion can be spotted using MHUI and 6 omnidirectional Lamb wave transducers. Lamb wave-based TFM (Total Focusing Method) creates an image for detecting cracks by combining the signals obtained from multiple transmitters and receivers. Coverage of different combinations of the transducers was estimated for several crack orientations. Experimental tests were carried out on an aluminum plate instrumented with two clusters of omnidirectional piezoelectric transducers 128, as shown in FIG. 7A. Results demonstrate the efficacy of the proposed approach by identifying the simulated damage at the correct locations, as shown in FIG. 7B, where a crack in the aluminum plate can be identified using the TFM image. In some embodiments, the robot 100 simultaneously utilizes both MHUI and TFM imaging techniques to process the information obtained by the couplant-free ultrasound generators to detect and evaluate corrosion and cracks in tubular structures, as shown in FIG. 8.

In addition, the motion control of the robot 100 may be influenced by an imaging algorithm in order to produce thorough images of problem areas. This is very important to consider that the location of the gripper blocks 104 can be controlled not only for stability and movement goals but also for inspection purposes.

While the robot 100 utilizes TFM and MHUI to obtain images of a tubular surface, the method of sensing is not limited to Lamb-wave based ultrasound imaging. In some embodiments, the toes 126 of the gripper blocks 104 may be outfitted to use magnetic flux, eddy current or automated visual inspection methods to determine defects in the tubular surface 10. In the case of eddy current-based inspection, the transducers 128 of the toes 126 of the gripper blocks 104 can be modified or otherwise outfitted to detect eddy currents and variations in eddy currents within the tubular surface 10. In other embodiments, the visual inspection can be performed using the borescope 130A along with the camera 131. In some embodiments, a magnetic gauss meter can be installed onboard the robot 100 for measuring magnetic field along the tubular surface 10.

In some embodiments, the robot 100 also includes repair equipment including but not limited to welding or brazing equipment to mend cracks and other types of structural damage in copper or other types of tubing that the tubular surface 10 can comprise. In other embodiments, the robot 100 includes equipment to repair composite structures such as fabric and resin. In some embodiments, each of the gripper blocks 104 can be modified to heat surfaces for re-curing or bending.

It should be understood from the foregoing that, while particular embodiments have been illustrated and described, various modifications can be made thereto without departing from the spirit and scope of the invention as will be apparent to those skilled in the art. Such changes and modifications are within the scope and teachings of this invention as defined in the claims appended hereto.

What is claimed is:

1. A robotic device, comprising:
   a plurality of gripper blocks, each gripper block comprising:
   a plurality of toes engaged with an underside of the gripper block,
   the plurality of toes comprising:
   a plurality of transducers, each of the plurality of transducers operable for transmitting a plurality of signals through a surface and receiving a plurality of feedback signals through the surface;
   an elongated backbone engaged with each of the plurality of gripper blocks, the elongated backbone comprising:
   a plurality of linear actuators; and
   one or more rotational actuators, each of the one or more rotational actuators linking each of the plurality of linear actuators such that the elongated backbone bends and accommodates rotation and repositioning of the plurality of gripper blocks;
   wherein the device is operable for traveling along the surface by actuating the linear actuators or by actuating the rotational actuators and bending the elongated backbone relative to the surface such that the elongated backbone disengages a gripper block of the plurality of gripper blocks from a first position of the surface, moves the gripper block away from the first position of the surface, moves the gripper block over a second position of the surface different from the first position of the surface, and lowers the gripper block to re-engage the surface along the second position, the gripper block sensing along both of the first position and the second position of the surface.

2. The robotic device of claim 1, wherein each of the plurality of toes defines a curved profile having a concave surface and wherein the concave surface of the plurality of toes comprises a friction pad.

3. The robotic device of claim 2, wherein the surface is a tubular structure and wherein the concave surface of each of the plurality of toes contacts the surface.

4. The robotic device of claim 1, further comprising a tail portion engaged with one of the plurality of gripper blocks, wherein the tail portion comprises one or more sensors.

5. The robotic device of claim 4, wherein the tail portion comprises a plurality of segments, each of the plurality of segments connected by a rotational actuator.

6. The robotic device of claim 1, further comprising a first motor and a second motor respectively engaging each gripper block with the first and second linear actuators such that each gripper block can be rotated relative to the backbone.

7. The robotic device of claim 1, wherein the plurality of signals includes an ultrasonic waveform.

8. The robotic device of claim 1, wherein the linear actuators are configured to lengthen or shorten the backbone.

9. The robotic device of claim 4, further comprising a repair tool mounted on at least one of the gripper blocks.

10. A system, comprising:
    a device, comprising:
    a backbone; and
    a plurality of gripper blocks extending from the backbone, each gripper block comprising:
    a plurality of toes engaged with an underside of the gripper block,
    the plurality of toes comprising:
    a plurality of transducers, the plurality of transducers operable for transmitting a plurality of signals through a surface and receiving a plurality of feedback signals through the surface;
    a processor in communication with the device and a memory coupled therewith, the processor operable to execute instructions to:
    access the plurality of feedback signals from the plurality of transducers; and
    construct an image of the surface using the plurality of feedback signals;
    wherein the device utilizes the backbone for traveling along the surface such that the backbone bends to lift the plurality of gripper blocks away from the surface and reposition the plurality of gripper blocks at predetermined positions along the surface.

11. The system of claim 10, wherein the plurality of signals comprises an ultrasonic waveform.

12. The system of claim 11, wherein the ultrasonic waveform comprises a guided Lamb wave.

13. The system of claim 10, wherein the image of the surface is generated by combining the plurality of feedback signals generated at each of a plurality of predetermined locations along the surface.

14. The system of claim 13, wherein the image of the surface is generated using a total focusing method.

15. The system of claim 13, wherein the image of the surface is generated using a multi-helical ultrasound imaging method.

16. A method, comprising:
    providing a robot that engages a surface of a structure, the robot including a backbone, a plurality of gripper blocks and a plurality of transducers, wherein the robot utilizes bending of the backbone for traveling along the surface by lifting the plurality of gripper blocks away from first positions of the surface and repositioning the plurality of gripper blocks to engage second positions of the surface;
    receiving at a processor a plurality of feedback signals from the surface using the plurality of transducers as signals are sent through the surface using the plurality of transducers; and
    combining the plurality of feedback signals into an image.

17. The method of claim 16, wherein the plurality of feedback signals are resultant of the plurality of subsonic signals traveling through the surface.

18. The method of claim 16, wherein the method is sequentially repeated by positioning the robot on a plurality of locations on the surface.

19. The method of claim 16, wherein the image is produced from the plurality of feedback signals using a guided wave total focusing method.

20. The method of claim 16, wherein the image is produced from the plurality of feedback signals using a multi-helical ultrasound imaging method.

* * * * *